(12) United States Patent
Watanabe et al.

(10) Patent No.: US 12,531,413 B2
(45) Date of Patent: Jan. 20, 2026

(54) POWER GENERATION AMOUNT MANAGEMENT SYSTEM AND POWER GENERATION AMOUNT MANAGEMENT METHOD

(71) Applicant: HITACHI, LTD., Tokyo (JP)

(72) Inventors: Tohru Watanabe, Tokyo (JP); Masato Utsumi, Tokyo (JP); Ikuo Shigemori, Tokyo (JP); Hiroshi Iimura, Tokyo (JP); Hiroaki Ogawa, Tokyo (JP); Daisuke Hamaba, Tokyo (JP)

(73) Assignee: HITACHI, LTD., Tokyo (JP)

( * ) Notice: Subject to any disclaimer, the term of this patent is extended or adjusted under 35 U.S.C. 154(b) by 391 days.

(21) Appl. No.: 18/024,511

(22) PCT Filed: Sep. 8, 2021

(86) PCT No.: PCT/JP2021/033061
§ 371 (c)(1),
(2) Date: Mar. 3, 2023

(87) PCT Pub. No.: WO2022/168357
PCT Pub. Date: Aug. 11, 2022

(65) Prior Publication Data
US 2023/0327440 A1   Oct. 12, 2023

(30) Foreign Application Priority Data
Feb. 8, 2021 (JP) .................................. 2021-018154

(51) Int. Cl.
*H02J 3/00* (2006.01)
*G06Q 50/06* (2012.01)
*H02J 3/38* (2006.01)

(52) U.S. Cl.
CPC .............. *H02J 3/004* (2020.01); *G06Q 50/06* (2013.01); *H02J 3/003* (2020.01); *H02J 3/381* (2013.01);
(Continued)

(58) Field of Classification Search
CPC ...................................................... Y04S 10/123
See application file for complete search history.

(56) References Cited

U.S. PATENT DOCUMENTS

2015/0227870 A1*  8/2015  Noboa .............. G06Q 10/0635
                                                                    705/7.28
2018/0375333 A1* 12/2018  Matsuo ..................... H02J 3/48
(Continued)

FOREIGN PATENT DOCUMENTS

CN    108510212 A  *  9/2018
JP    2011038499 A  *  2/2011
(Continued)

OTHER PUBLICATIONS

International Search Report of PCT/JP2021/033061 dated Nov. 9, 2021.

*Primary Examiner* — Suresh Suryawanshi
(74) *Attorney, Agent, or Firm* — MATTINGLY & MALUR, PC

(57) ABSTRACT

A system refers to actual weather data made publicly available by a first institution, and creates a model that uses a value of a weather element for each section as an input and uses a value of a renewable energy power generation amount of the area as an output based on the actual value of the weather element calculated for each section, and the actual value of the renewable energy power generation amount of the area. The system refers to weather prediction data made publicly available by the second institution, and calculates an actual value of the weather element regarding each of the plurality of sections including the area based on a prediction (Continued)

value of the weather element for each segment in the corresponding section, and calculates a prediction value of the renewable energy power generation amount based on the prediction value of the weather element for each section.

10 Claims, 13 Drawing Sheets

(52) U.S. Cl.
CPC ....... *H02J 2203/10* (2020.01); *H02J 2203/20* (2020.01); *H02J 2300/22* (2020.01); *H02J 2300/28* (2020.01)

(56) References Cited

U.S. PATENT DOCUMENTS

| | | | |
|---|---|---|---|
| 2020/0266628 A1* | 8/2020 | Kato | H02J 3/004 |
| 2022/0200279 A1* | 6/2022 | Kawakami | G06Q 10/04 |

FOREIGN PATENT DOCUMENTS

| | | | | |
|---|---|---|---|---|
| JP | 2015061395 A | * | 3/2015 | |
| JP | 2016136807 A | | 7/2016 | |
| JP | 2017139031 A | * | 8/2017 | |
| TW | 201727559 A | * | 8/2017 | |
| WO | WO-2020121447 A1 | * | 6/2020 | ............... C25B 1/04 |

* cited by examiner

FIG. 4A

| TIME | AVERAGE SOLAR RADIATION AMOUNT [W/m²] OF ANALYTICAL GRID 1 | AVERAGE SOLAR RADIATION AMOUNT [W/m²] OF ANALYTICAL GRID 2 | ... |
|---|---|---|---|
| 2020/1/1 0:00 | 0 | 0 | ... |
| 2020/1/1 3:00 | 0 | 0 | ... |
| 2020/1/1 6:00 | 0 | 0 | ... |
| 2020/1/1 9:00 | 300 | 300 | ... |
| 2020/1/1 12:00 | 900 | 900 | ... |
| 2020/1/1 15:00 | 750 | 750 | ... |
| 2020/1/7 21:00 | 0 | 0 | ... |
| 2020/1/8 0:00 | 0 | 0 | ... |

FIG. 5

| TIME INTERVAL | EXPLAINED VARIABLE Y | EXPLANATORY VARIABLE X | | | | | 501 |
|---|---|---|---|---|---|---|---|
| | ACTUAL POWER GENERATION AMOUNT | TIME INTERVAL-BASED MESH SOLAR RADIATION AMOUNT [W/m²] | | | | | |
| | | $X_1$ | $X_2$ | ... | $X_{11}$ | $X_{12}$ | |
| 2020/1/1 0:00~3:00 | 0 | 0 | 0 | ... | 0 | 0 | |
| 2020/1/1 3:00~6:00 | 0 | 0 | 0 | ... | 0 | 0 | |
| 2020/1/1 6:00~9:00 | 6000 | 300 | 300 | ... | 250 | 250 | |
| 2020/1/1 9:00~12:00 | 18300 | 900 | 910 | ... | 850 | 850 | |
| 2020/1/1 12:00~15:00 | 18700 | 900 | 890 | ... | 850 | 900 | |
| 2020/1/7 18:00~21:00 | | 0 | 0 | ... | 0 | 0 | |

FIG. 6A

| | TIME | AVERAGE SOLAR RADIATION AMOUNT [W/m²] OF ANALYTICAL GRID 1 | AVERAGE SOLAR RADIATION AMOUNT [W/m²] OF ANALYTICAL GRID 2 | ... |
|---|---|---|---|---|
| PRESENT ↓ | 2020/1/8 0:00 | 0 | 0 | ... |
| | 2020/1/8 3:00 | 0 | 0 | ... |
| | 2020/1/8 6:00 | 0 | 0 | ... |
| | 2020/1/8 9:00 | 300 | 300 | ... |
| | 2020/1/8 12:00 | 900 | 850 | ... |
| | 2020/1/8 15:00 | 750 | 750 | ... |
| | 202/1/8 18:00 | 250 | 250 | ... |
| | ... | ... | ... | ... |
| | 2020/1/9 21:00 | 0 | 0 | ... |
| FUTURE | 2020/1/10 0:00 | 0 | 0 | ... |

FIG. 6B

| TIME | MWh |
|---|---|
| 2020/1/8 0:00 | 0 |
| 2020/1/8 0:30 | 0 |
| ... | ... |
| 2020/1/8 8:30 | 1900 |
| 2020/1/8 9:00 | 2400 |
| 2020/1/8 9:30 | 2700 |
| 2020/1/8 10:00 | 3100 |
| 2020/1/8 10:30 | 3300 |
| 2020/1/8 11:00 | 3400 |
| 2020/1/8 11:30 | 3400 |
| 2020/1/8 12:30 | 3300 |
| ... | ... |
| 2020/1/9 23:30 | 0 |

MESH SOLAR RADIATION AMOUNT (kWh/m²)  MESH SOLAR RADIATION AMOUNT (kWh/m²)  MESH SOLAR RADIATION AMOUNT (kWh/m²)

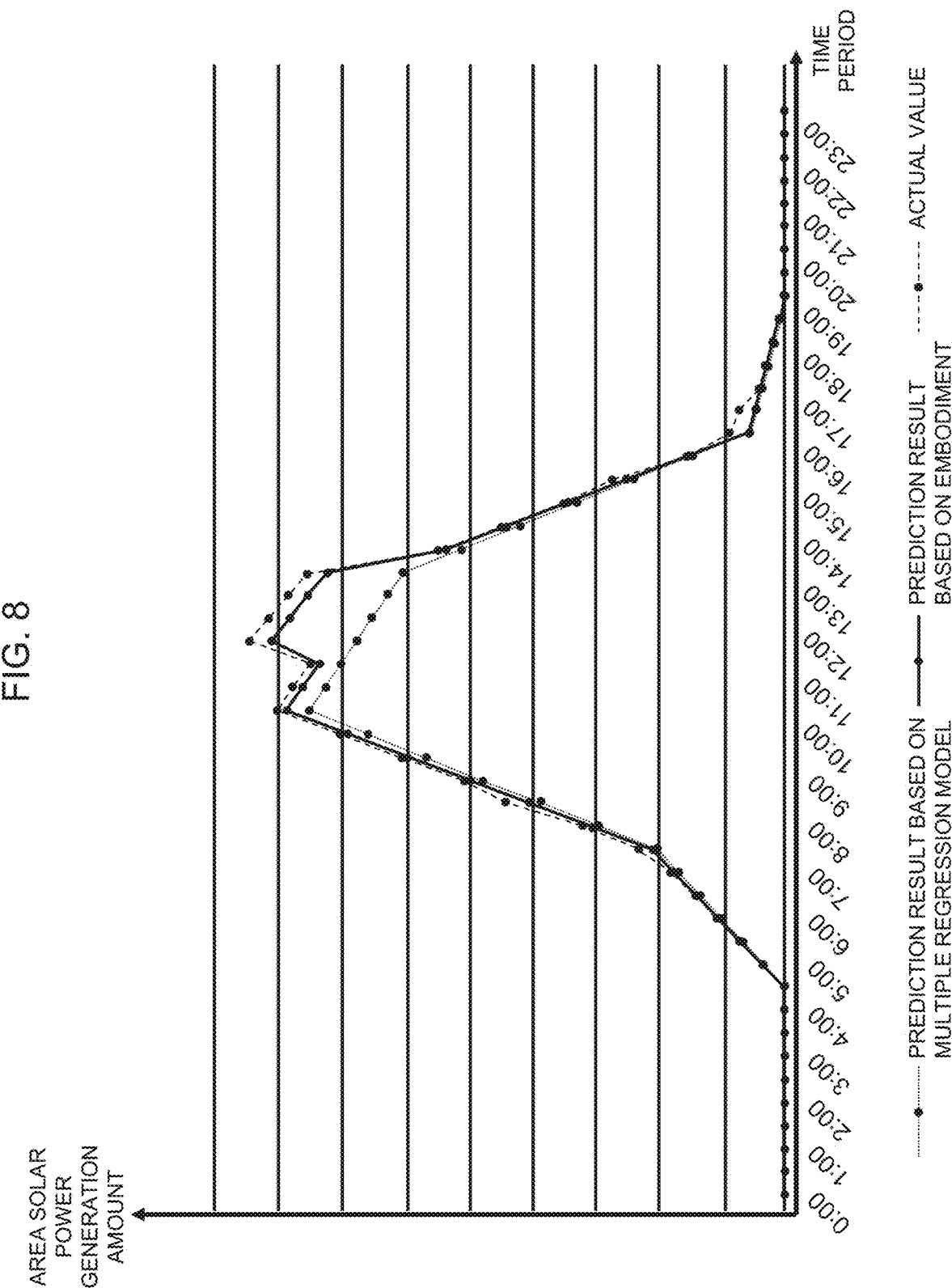

POWER GENERATION AMOUNT MANAGEMENT SYSTEM AND POWER GENERATION AMOUNT MANAGEMENT METHOD

TECHNICAL FIELD

The present invention generally relates to management of a power generation amount.

BACKGROUND ART

For example, the process of analyzing phenomena and estimating the current and past phenomena or predicting the future phenomena is being performed. Specifically, for example, in meteorological analysis, the process of simulating and predicting the future is performed by estimating the past and current atmospheric state based on data assimilation using the governing equation and the observational data of air motion, and performing analytical calculation (typically, analytical calculation based on the grid method, finite element method, finite volume method or the like) of time evolution based on the governing equation of air motion to the initial value using weather observation data.

For example, in Japan, prediction data based on numerical analysis is made publicly available by the Japan Meteorological Agency as a global numerical weather prediction model GPV (referred to as "GSM") or a MesoScale Model GPV (referred to as "MSM"), and as one such example there is prediction data of the solar radiation amount based on numerical analysis. Meanwhile, forecast data referred to as GSF and ex-post objective analysis data referred to as FNL are made publicly available by the US weather agency.

Furthermore, in the energy sector, attempts are being made for predicting the power generation amount based on renewable energy (hereinafter referred to as the "renewable energy power generation amount") by using weather observation data. For example, PTL 1 describes predicting the power generation amount by referring to a weather prediction value of an installation site of a power generator to perform power generation based on renewable energy (hereinafter referred to as the "renewable energy power generator"), and multiplying the predicted power generation amount by the power generation conversion factor prescribed from the engineering characteristics of the renewable energy power generator.

CITATION LIST

Patent Literature

[PTL 1] Japanese Unexamined Patent Application Publication No. 2016-136807

SUMMARY OF THE INVENTION

Problems to be Solved by the Invention

However, with PTL 1, if the installation site, installation requirement or engineering characteristic of each any every renewable energy power generator is unknown, there is a problem in that it is difficult to predict the renewable energy power generation amount of the overall area covering the installation sites. Generally speaking, it is technically difficult to manage the installation site, installation requirement or engineering characteristic of each any every renewable energy power generator. For example, the installation sites of renewable energy power generators and the capacity of power conditioners within the renewable energy power generators are not available to the public.

The present invention was devised in view of the foregoing points, and an object of this invention is to enable the prediction of the renewable energy power generation amount of an area even when the installation site, installation requirement or engineering characteristic of the renewable energy power generators is unknown.

Means to Solve the Problems

Actual power generation data is made publicly available by a first institution. The actual power generation data is data which represents an actual value of a renewable energy power generation amount for each past time interval regarding an area. Meanwhile, actual weather data and weather prediction data are made publicly available by a second institution. The actual weather data is data which represents an actual value of a weather element for each past time interval regarding each of a plurality of segments, and weather prediction data is data which represents a prediction value of a weather element for each future time interval regarding each segment. The "time interval" regarding the actual power generation data and the "time interval" regarding the actual weather data and the actual weather data may be the same duration or a different duration.

Accordingly, based on the actual power generation data and the actual weather data (and weather prediction data), the actual value (and prediction value) will differ depending on whether it relates to an area, or relates to a segment that is smaller than an area.

Thus, the power generation amount management system refers to the actual weather data, and calculates an actual value of a weather element for each past time interval regarding each of a plurality of sections including the area based on an actual value of a weather element for each past time interval regarding each of one or more segments in the corresponding section. The power generation amount management system refers to the actual power generation data, and creates a power generation conversion model which is a model that uses a value of a weather element for each section as an input and uses a value of the renewable energy power generation amount of the area as an output based on the actual value of the weather element calculated regarding each past time interval for each section, and the actual value of the renewable energy power generation amount of the area regarding each past time interval.

Furthermore, the power generation amount management system refers to the weather prediction data, and calculates a prediction value of the weather element of a future time interval regarding each of the plurality of sections including the area based on a prediction value of the weather element of a future time interval regarding each of one or more segments belonging to the corresponding section, and calculates a prediction value of the renewable energy power generation amount of a future time interval regarding the area by inputting the prediction value of the weather element calculated for each section into the power generation conversion model.

Advantageous Effects of the Invention

According to the present invention, it is possible to predict the renewable energy power generation amount of an area

BRIEF DESCRIPTION OF DRAWINGS

FIG. 4A is a diagram showing a configuration example of the actual weather data.

FIG. 5 is a diagram showing a configuration example of the training data.

FIG. 6A is a diagram showing a configuration example of the weather prediction data.

FIG. 6B is a diagram showing a configuration example of the power generation prediction data.

FIG. 8 is a diagram showing an example of the prediction result according to an embodiment.

DESCRIPTION OF EMBODIMENTS

Figure 1:
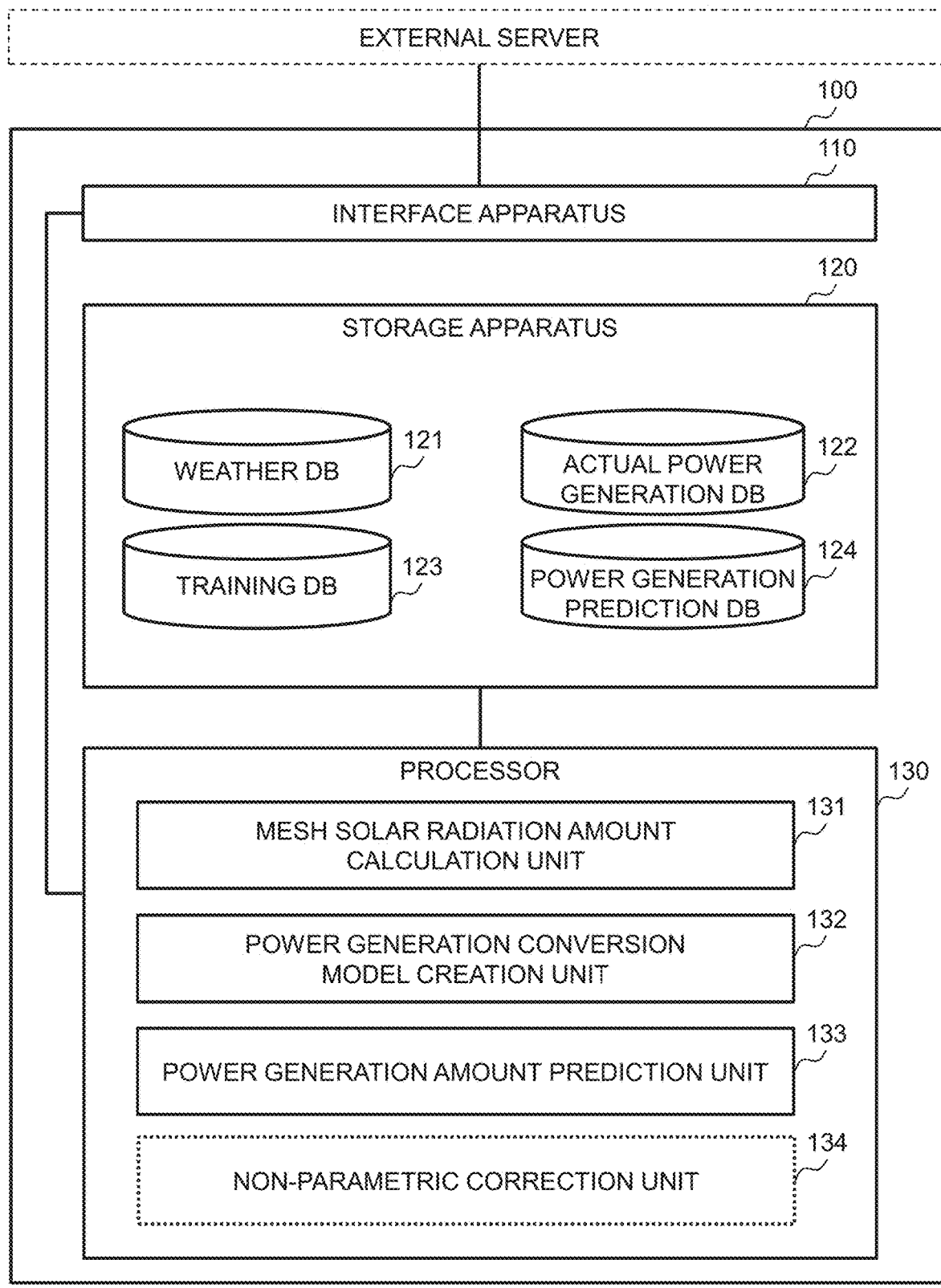
FIG. 1 is a block diagram showing a configuration example of the power generation amount management system according to an embodiment of the present invention.

In the following explanation, "interface apparatus" may be one or more interface devices. The one or more interface devices may be at least one of the following.

One or more I/O (input/Output) interface devices. An I/O (input/Output) interface device is an interface device to at least one of either an I/O device or a remote display computer. An I/O interface device to a display computer may be a communication interface device. At least one I/O device may be a user interface device, for example, one of either an input device such as a keyboard or a pointing device, or an output device such as a display device.

One or more communication interface devices. One or more communication interface devices may be one or more same type of communication interface devices (for example, one or more NICs (Network Interface Cards)) or two or more different types of communication interface devices (for example, an NIC and an HBA (Host Bus Adapter)).

Moreover, in the following explanation, "memory" is one or more memory devices, and is typically a primary storage device. At least one memory device in a memory may be a volatile memory device or a nonvolatile memory device.

Moreover, in the following explanation, "persistent storage device" is one or more persistent storage devices. A persistent storage device is typically a non-volatile storage device (for example, auxiliary storage device), and is specifically, for example, an HDD (Hard Disk Drive) or an SSD (Solid State Drive).

Moreover, in the following explanation, "storage device" may be at least a memory or a memory of a persistent storage device.

Moreover, in the following explanation, "processor" is one or more processor devices. While at least one processor device is typically a microprocessor device such as a CPU (Central Processing Unit), it may also be another type of processor device such as a GPU (Graphics Processing Unit). At least one processor device may be a single-core processor device or a multi-core processor device. At least one processor device may be a processor core. At least one processor device may be a processor device in a broad sense such as a hardware circuit (for example, FPGA (Field-Programmable Gate Array), or ASIC (Application Specific Integrated Circuit)) which performs a part or all of the processing.

Moreover, in the following explanation, while a function may be explained using an expression such as "yyy unit", the function may be realized by one or more computer programs being executed with a processor, or realized by one or more hardware circuits (for example, FPGA or ASIC), or realized based on a combination thereof. When a function is realized by a program being executed with a processor, since predetermined processing will be performed using a storage device and/or an interface device as appropriate, the function may also be at least a part of the processor. Processing explained with a function as the subject may be processing performed by a processor or a device including such processor. A program may be installed from a program source. A program source may be, for example, a recording medium (for example, non-temporary recording medium) readable with a program distribution computer or a computer. The explanation of each function is an example, and a plurality of functions may be consolidated into one function, or one function may be divided into a plurality of functions.

An embodiment of the present invention is now explained in detail with reference to the appended drawings. Note that, in the following embodiment, sunlight is adopted as an example of renewable energy, and the solar radiation amount is adopted as an example of a weather element that influences the renewable energy power generation amount.

FIG. 1 is a diagram showing an example of the configuration of a power generation amount management system 100 according to an embodiment of the present invention.

The power generation amount management system 100 comprises an interface apparatus 110 which performs data communication with an external server, a storage apparatus 120 which stores data, and a processor 130 which is connected to the interface apparatus 110 and the storage apparatus 120. The power generation amount management system 100 may also be a system (for example, cloud computing system) that is realized on a system (for example, cloud platform) including a plurality of types of calculation resources such as the interface apparatus 110, the storage apparatus 120 and the processor 130.

The storage apparatus 120 stores information and a program group (one or more programs). As such information, for example, there are a weather DB 121 which stores numerical weather data (data including a prediction value and an actual value of the solar radiation amount) acquired from the foregoing external server (for example, server of the Japan Meteorological Agency, server of a foreign weather agency, or server of a Japanese or foreign private weather forecast company), an actual power generation DB 122 which stores actual power generation data (data including an actual value of the solar power generation amount of an area) acquired from the external server, a training DB 123 which stores training data of a power generation conversion model described later, and a power generation prediction DB 124 which stores power generation prediction data (data including a prediction value of the solar power generation amount of an area). The numerical weather data includes actual weather data and weather prediction data made publicly available by a second institution. The actual power generation data is data made publicly available by a first institution.

The numerical weather data stored in this embodiment may be GSF forecast data of a global numerical weather prediction model, and FNL objective analysis data. In substitute for in addition to the foregoing data, the numerical weather data may also be numerical data such as GSM and GSF as the global numerical weather prediction model GPV, objective analysis data GSM and FNL, MSM as the MesoScale Model GPV, and LFM of the local numerical forecast model GPV.

Functions such as a mesh solar radiation amount calculation unit 131, a power generation conversion model creation unit 132 and a power generation amount prediction unit 133 are realized as a result of a program group in the storage apparatus 120 being executed by the processor 130. Note that, as an optional function, a non-parametric correction unit 134 may also be realized. Each function will be described later.

Figure 2:
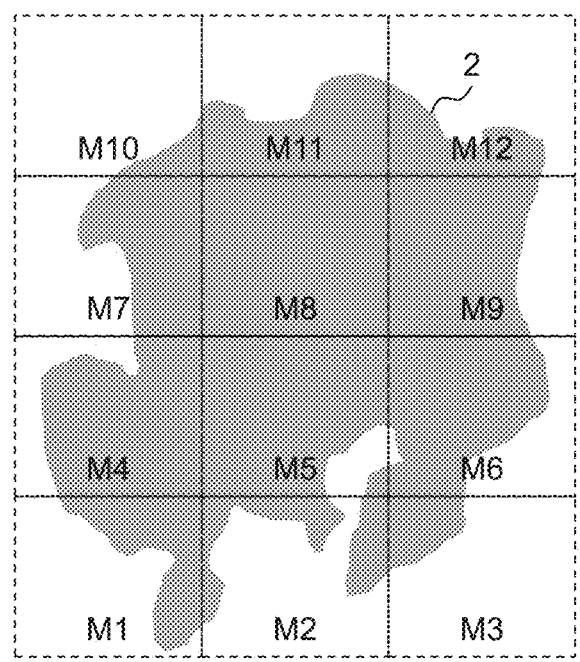
FIG. 2 is a diagram showing an example of the relation of the power supply area and the meshes.

FIG. 2 is a diagram showing an example of the relation of an area 2 where a plurality of solar power generators is installed and a plurality of meshes used in this embodiment.

As the area 2, while a geographical zone such as a country, one of the eight regional divisions, or a prefecture may be adopted, an arbitrary range in the world may also be adopted as the area. In this embodiment, the area 2 is a power supply area (for example, Kanto region as an example of a geographical zone in Japan) to which a power transmission company supplies power, and the total power generation amount of the solar power generators in the area 2 is publicly announced by the power transmission company after aggregating such power generation amounts. A power generation company and others plan the power generation of their own thermal power generators and hydroelectric generators while anticipating the power demand in the area 2 and the power generation amount of other power generation companies based on information publicly announced by the power transmission company.

A predetermined range including the area 2 is divided into a plurality of meshes. A "predetermined range including the area 2" may be a range that completely coincides with the area 2, but may also be a range of a predetermined shape (for example, rectangle) that covers the area 2. A mesh is an example of a section. According to the example shown in FIG. 2, while a mesh may be a rectangle, the mesh may also be a shape other than a rectangle. Moreover, while the shape and size of the meshes are typically uniform, the meshes may include a mesh of a different shape and size. According to the example shown in FIG. 2, the rectangular range including the area 2 is divided into 12 rectangular meshes. To put it differently, the 12 rectangular meshes include the overall area 2. The 12 meshes are numbered M1, M2, . . . , M12.

The meshes may also be set in accordance with, for example, a standardized regional primary mesh (one side is approximately 80 kilometers), a standardized regional secondary mesh (one side is approximately 10 kilometers), and a standardized regional tertiary mesh (one side is approximately 1 kilometer) of the national geography. Meanwhile, with regard to the foregoing numerical weather data, for example, GSF and FNL may also include a numerical value for each analytical grid (meteorological analytical grid) placed in intervals of approximately 22 kilometers. Roughly 9 weather grids are included in the standardized regional primary mesh. Here, an "analytical grid" (also referred to as an "analytical mesh") is an example of a segment.

Details of the processing performed by the power generation amount management system 100 are now explained with reference to FIG. 3 to FIG. 5. Note that, in the drawings, while the time is expressed in year/month/day/hour/minute, it may also be expressed in coarser or finer units.

Figure 3:
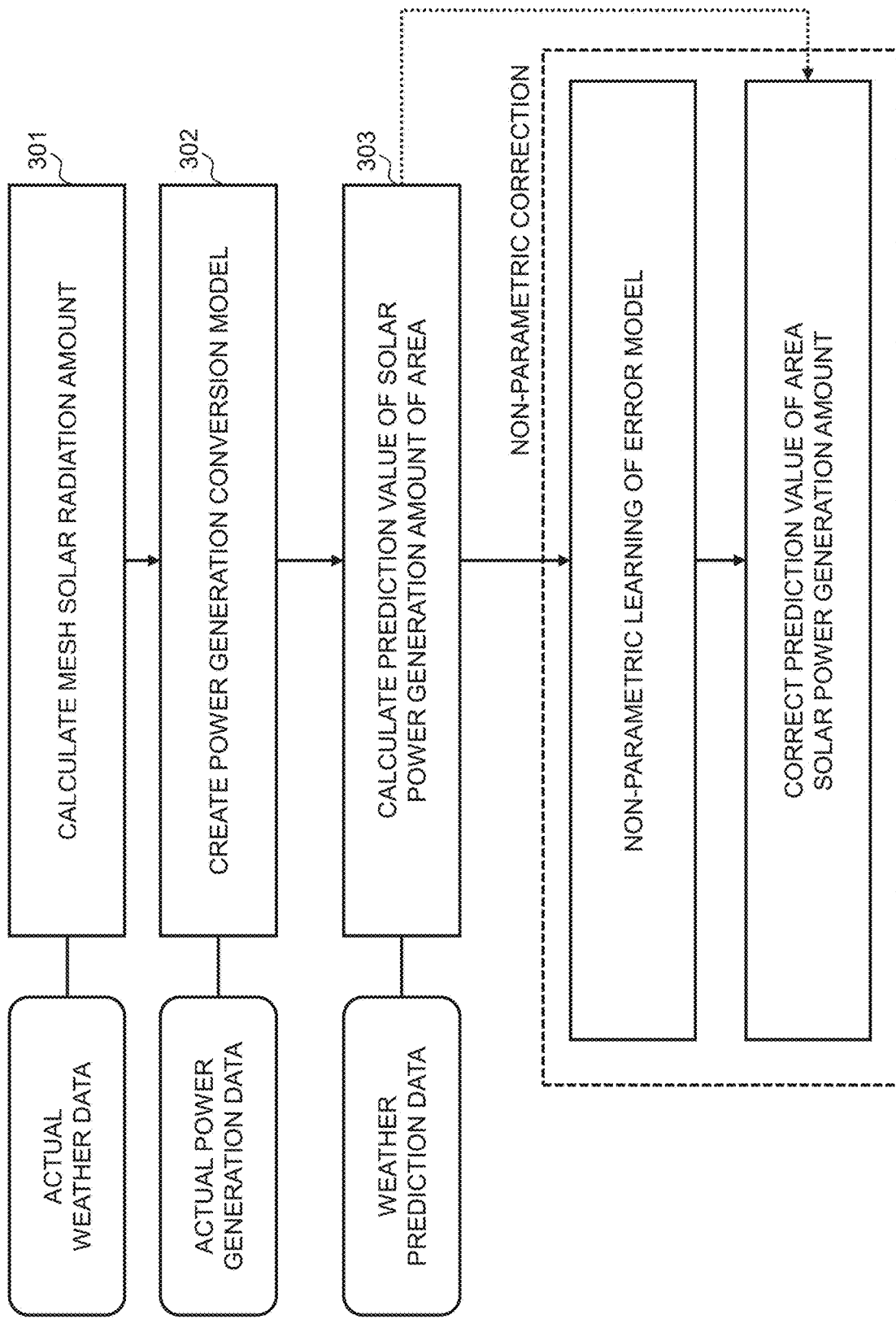
FIG. 3 is a flowchart of the prediction processing of the solar power generation amount.

FIG. 3 is a flowchart of the prediction processing of the solar power generation amount in the area 2.

In step 301, the mesh solar radiation amount calculation unit 131 refers to the actual weather data among the numerical weather data stored in the weather DB 121. The actual weather data is, as illustrated in FIG. 4A, data representing an actual value of a solar radiation amount regarding each of a plurality of past time intervals for each analytical grid. For example, with GSF, a value of the average solar radiation amount $[W/m^2]$ every 3 hours is stored for each analytical grid (for example, in FIG. 4A, an average solar radiation amount of Jan. 1, 2020; 9:00 to 12:00 is recorded in the record of Jan. 1, 2020; 12:00). The mesh solar radiation amount calculation unit 131 calculates the average solar radiation amount Fj of the corresponding mesh Mj (j is an arbitrary natural number among 1≤j≤12) for each of the meshes M1 to M12. Thus, the mesh solar radiation amount calculation unit 131 extracts all analytical grids included in the mesh Mj from the actual weather data, totals the average solar radiation amounts of the extracted analytical grid for each time interval (for example, 3 hours), divides the total average solar radiation amount by the number of analytical grids in the mesh Mj, and thereby calculates the time interval-based mesh solar radiation amount $X_j$ $[W/m^2]$, which is the average solar radiation amount Fj for each time interval regarding the mesh Mj.

Figure 4B:
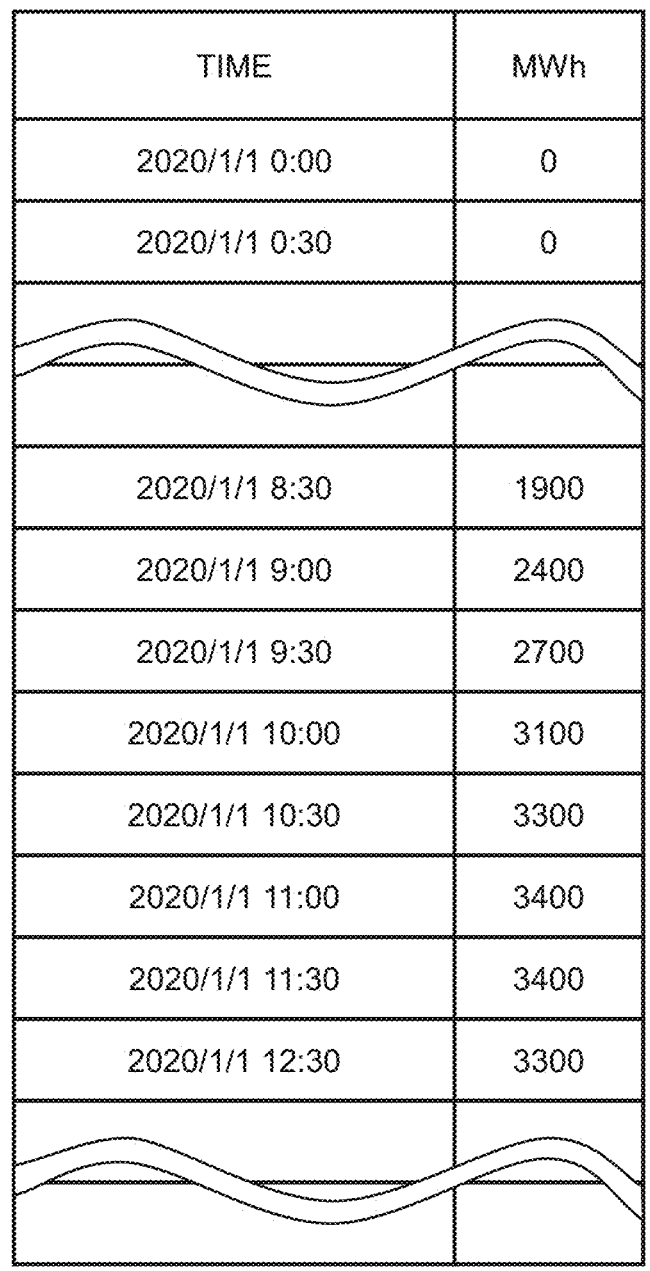
FIG. 4B is a diagram showing a configuration example of the actual power generation data.

In step 302, the power generation conversion model creation unit 132 refers to the actual power generation data (see FIG. 4B) stored in the actual power generation DB 122. The actual power generation data is, as illustrated in FIG. 4B, data representing the actual value of the solar power generation amount in the area 2 for each time interval. According to the example shown in FIG. 4B, the actual power generation data shows the actual value of the solar power generation amount in 30-minute intervals of the solar power generator in the area 2. The power generation conversion model creation unit 132 calculates the actual value of the solar power generation amount for each time interval at a time interval that matches the time interval represented by the foregoing actual weather data. For example, as the actual value of the solar power generation amount corresponding to the record of Jan. 1, 2020; 12:00 of the actual weather data (FIG. 4A), the sum total from the actual value in the record of Jan. 1, 2020; 9:00 of the actual power generation data (actual value of the solar power generation amount from 9:00 to 9:30) to the actual value in the record of Jan. 1, 2020; 11:30 (actual value of the solar power generation amount from 11:30 to 12:00) is calculated. The power generation conversion model creation unit 132 stores, as the training data (see FIG. 5) in the training DB 123, data including a pair of the calculated actual value of the solar power generation amount and the actual value of the time interval-based mesh solar radiation amount regarding each of the meshes M1 to M12 for each time interval (for example, every 3 hours). The training data may be prepared for each season such as winter, summer or any other season, and, in the foregoing case, it can be expected that the influence from an error caused by changes in the solar radiation amount, which are caused by obstacles, that reaches the solar power generator due to changes in the solar altitude depending on the season will decrease.

Furthermore, in step 302, the power generation conversion model creation unit 132 creates a model regarding each time interval in which the actual value of the solar power generation amount is used as the explained variable and the time interval-based mesh solar radiation amounts $X_1$ to $X_{12}$ of the meshes M1 to M12 are used as the explanatory variable among the training data; that is, a power generation conversion model in which the following mathematical formula (Math 1) is used as an example (model in which time interval-based mesh solar radiation amounts $X_1$ to $X_{12}$ are used as the input and the area solar power generation amount is used as the output). In this model creation, the power generation conversion model creation unit 132 decides parameters a, b, c, d and $e_j$ by performing processing of non-linear regression. The power generation conversion model creation unit 132 stores the created power generation conversion model in the storage apparatus 120.

$$Y = \sum_{j=1}^{N} \left( \left( \frac{c}{1 + e^{-a(\sum_{i=1}^{N} X_i - b)}} - d \right) \times e_j X_j \right) \quad \text{[Math 1]}$$

Nevertheless, N represents the number of meshes, and here it is N=12. Furthermore, (Math 1) is a model in which a non-linear model and a linear model are combined. Specifically, the term of Math 2 within Math 1 represents the characteristics of the non-linear model (Math 3) that is generally known as a sigmoid function.

$$\left( \frac{c}{1 + e^{-a(\sum_{i=1}^{N} X_i - b)}} - d \right) \quad \text{[Math 2]}$$

$$Y = \left( \frac{1}{1 + e^{-aX}} \right) \quad \text{[Math 3]}$$

The solar power generator does not perform power generation if there is no solar radiation amount that is a constant amount or more, and, even when the increase of the power output gradually decreases relative to the increase in the solar radiation amount, the relation of the solar radiation amount and the power output can be regressed moderately based on a non-linear model. $e_j X_j$ provides a linear model of the solar radiation amount of the meshes and the solar radiation amount of the overall area.

In addition to this embodiment, for example, it is possible to simply use (Math 4) and cause the power generation conversion model creation unit 132 to perform processing of identifying the relation of the solar radiation amount of each mesh and the actual area power generation amount as a combination of N-number of non-linear equations by deciding N-number of parameter groups. A "parameter group" is α-number (α is a natural number) of parameters, and in (Math 4) α=4 (that is; the parameter group consists of parameters $a_j$, $b_j$, $c_j$ and $d_j$). Accordingly, the number of parameters to be decided is N×α.

$$Y = \sum_{j=1}^{N} \left( \frac{c_j}{1 + e^{-a_j(X_j - b_j)}} - d_j \right) \quad \text{[Math 4]}$$

Nevertheless, in cases where there is bias in the training data, there is a problem in that spurious correlation may occur with a model requiring numerous parameters, and, moreover, there is a problem in that a non-linear model is required for each mesh. Thus, it is preferable to reduce the number of non-linear models of (Math 4), and perform the model identification of a non-linear model (for example, a single non-linear model) that is less than the number of meshes, and a model that is linearly coupled by applying, for each non-linear model, a weighting factor for each mesh to the corresponding non-linear model (model of (Math 1) which combines a non-linear model and a linear model). Since the model of (Math 1) is a model with fewer parameters than the model of (Math 4); that is, a model in which the degree of freedom has been reduced, the calculation amount is low, and, moreover, according to the method of (Math 1), since the weighting factor for each mesh is applied to the non-linear model, it can be expected that the deterioration in the estimation accuracy of the solar power generation amount can be suppressed.

Figure 7A:
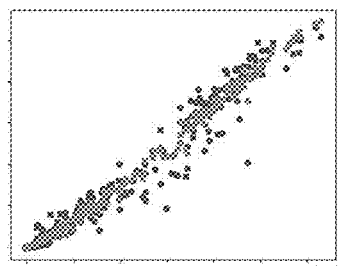
FIG. 7A is a graph showing an example of the relation of the solar radiation amount and the solar power generation amount regarding the area.
Figure 7B:
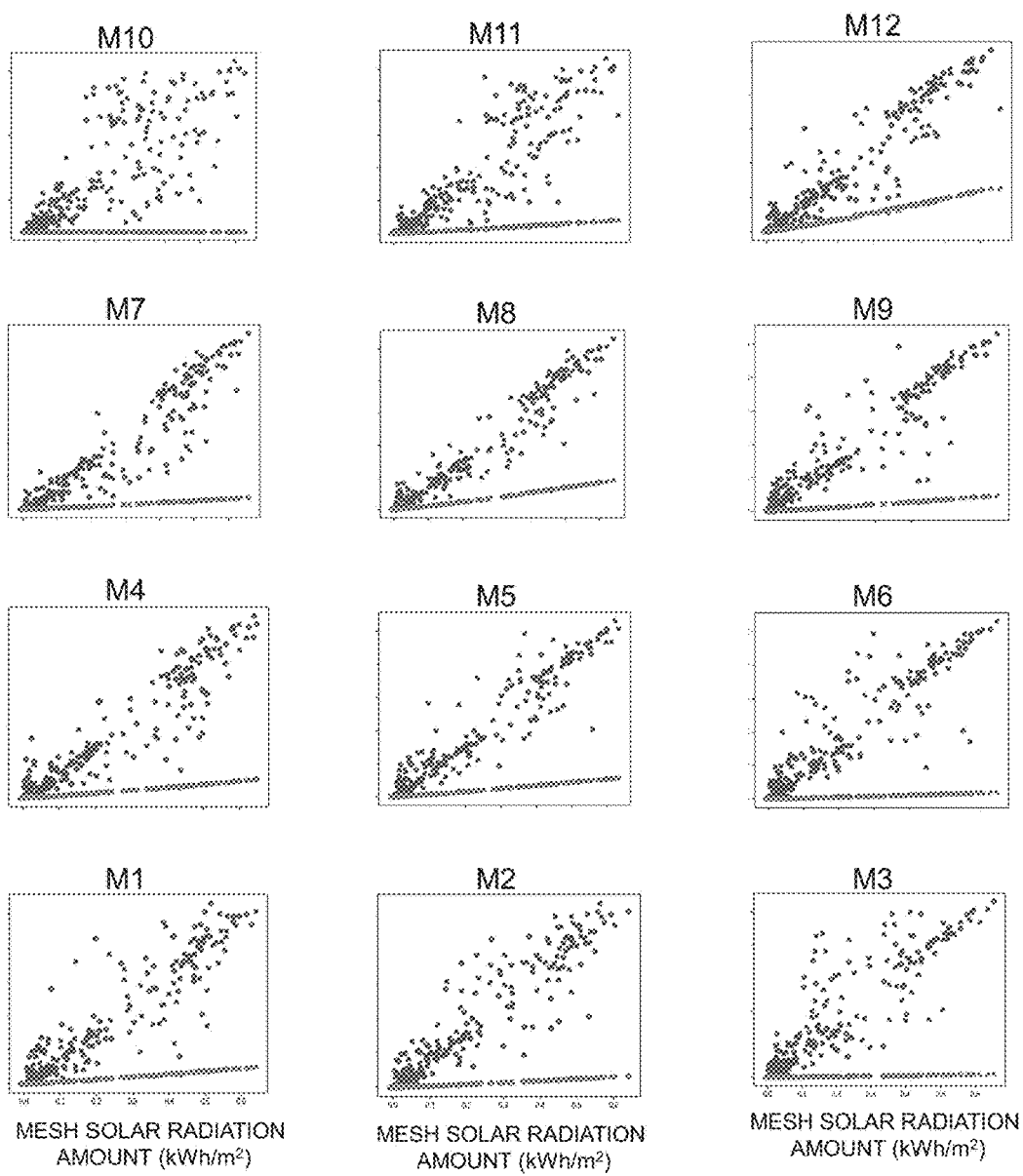
FIG. 7B is a graph showing an example of the relation of the solar radiation amount and the solar power generation amount for each mesh.

The outline of the power generation conversion model decided in step 302 is now explained with reference to FIG. 7A and FIG. 7B. The points in the graphs of FIG. 7A and FIG. 7B are a pair of the actual power generation amount and the total time interval-based mesh solar radiation amount recorded in the training data. In FIG. 7A, the horizontal axis shows the total value of the time interval-based mesh solar radiation amounts $X_1$ to $X_{12}$, and the vertical axis shows the actual value of the area solar power generation amount. Moreover, FIG. 7B shows a relation of the solar radiation amount and the actual power generation amount regarding each of the meshes M1 to M12 (curved line (aggregation of points) represented at the lower part of each graph) with the horizontal axis as the time interval-based mesh solar radiation amount $X_j$, and the vertical axis as the actual power generation amount expressed in Math 5.

$$Y_j = \left( \frac{c}{1 + e^{-a(\sum_{i=1}^{N} X_i - b)}} - d \right) \times e_j X_j \quad \text{[Math 5]}$$

The fact that there is a difference in the sensitivity of the solar power generation amount relative to the solar radiation amount for each mesh is reflected in the power generation conversion model based on the parameter $e_j$. Thus, according to FIG. 7A and FIG. 7B, the regression as the relation of the value of the area solar power generation amount and the time interval-based area solar radiation amount is linearly separated into regressions as the relation of the value of the area solar power generation amount and the time interval-based mesh solar radiation amount, and the relation of the value of the area solar power generation amount and the time interval-based mesh solar radiation amount is expressed as a non-linear regression for each mesh. The parameter $e_j$ corresponds to the weighting factor (radical correction factor) of the solar radiation amount $X_j$. The parameters a to d represent a non-linear (for example, sigmoid curve) shape.

Based on a formula in which the non-linear shape, the solar radiation amount $X_j$, and the parameter $e_j$ are defined, the factor (power generation conversion factor) in the power generation conversion model in which the value of the area solar power generation amount is the explained variable and the time interval-based mesh solar radiation amount is the explanatory variable can be identified based on the least squares method or other methods.

Referring once again to FIG. 3, in step 303, the power generation amount prediction unit 133 refers to the weather prediction data among the numerical weather data stored in the weather DB 121. The weather prediction data is, as illustrated in FIG. 6A, data representing a prediction value of the solar radiation amount regarding each of a plurality of past time intervals for each analytical grid. According to the example shown in FIG. 6A, the GSF forecast data represents the average solar radiation amount every 3 hours for each analytical grid (for example, an average solar radiation amount of Jan. 8, 2020; 6:00 to 9:00 is recorded in the record of Jan. 8, 2020; 9:00). The power generation amount prediction unit 133 calculates a prediction value of the solar radiation amount [W/m$^2$] every 3 hours regarding each of the meshes M1 to M12 based on the same method as the method of calculating the actual value of the solar radiation amount every 3 hours. The power generation amount prediction unit 133 calculates a prediction value of the area solar power generation amount Y by substituting the prediction values of the 12 time interval-based mesh solar radiation amounts calculated regarding the meshes M1 to M12 into $X_1$ to $X_{12}$ of the power generation conversion model created in step 302. The power generation amount prediction unit 133 stores the power generation prediction data in the power generation prediction DB 124. The power generation prediction data is, as illustrated in FIG. 6B, data which includes, for each time interval, a pair of the prediction value of the area solar power generation amount and the prediction value of the time interval-based mesh solar radiation amount regarding each of the meshes M1 to M12. Note that the power generation amount prediction unit 133 may also calculate a prediction value of the solar power generation amount for each time interval (for example, a shorter time interval) that is different from the time interval representing the weather prediction data by performing linear interpolation to the calculated prediction value.

FIG. 8 shows a prediction result of the solar power generation amount of this embodiment, a prediction result of the solar power generation amount of a comparative example (result of multiple regression prediction with time interval-based mesh solar radiation amounts $X_1$ to $X_{12}$ as the explanatory variable, and the area solar power generation amount as the explained variable), and an actual value of the area solar power generation amount.

A prediction error in this embodiment has decreased in comparison to the power generation amount error in the comparative example. Moreover, the problem that arises in multiple regression; that is, the problem of using the negative power generation amount as the prediction output at night, has decreased. Thus, according to this embodiment, the phenomenon unique to a solar power generator, which is that the solar power generation amount changes non-linearly relative to the solar radiation amount, can be moderately regressed based on a non-linear model, and it is expected that the spurious correlation that arises in multiple regression can be eliminated.

The foregoing explanation of this embodiment can be summarized, for example, as follows.

While the actual value of the solar power generation amount represented by the actual power generation data is a numerical value representing the overall area, the numerical weather data does not include a numerical weather value representing the overall area 2.

Thus, a range covering the area 2 is divided into a plurality of meshes M1 to M12. The mesh solar radiation amount calculation unit 131 calculates the time interval-based mesh solar radiation amount $X_j$ regarding each mesh Mj based on the actual weather data. The power generation conversion model creation unit 132 identifies the solar power generation amount $Y_j$=from the actual power generation data, and calculates the power generation conversion factor $C_j$ for each mesh by solving $Y_j = C_1 \times X_1 + C_2 \times X_2 + \ldots + C_N \times X_N$. In this manner, a power generation conversion model as a model in which the value of the time interval-based mesh solar radiation amount for each mesh as the input and the value of the area solar power generation amount as the output is created. The power generation amount prediction unit 133 calculates the time interval-based mesh solar radiation amount $X_j$ regarding each mesh Mj based on the weather prediction data, and predicts the area solar power generation amount by using the power generation conversion model and the time interval-based mesh solar radiation amount $X_j$ for each mesh Mj. Consequently, even if the installation site, installation requirement or engineering characteristic of the solar power generators is unknown, the solar power generation amount of the area 2 can be predicted. Note that, when the time interval unit of the numerical values representing the numerical weather data and the time interval unit of the numerical values representing the actual power generation data are different, the time interval units may be unified based on a method such as linear interpolation.

The power generation conversion model may be combined with a linear model having a parametric non-linear model for each mesh and a non-linear model thereof as elements. For example, as a result of a non-linear model of the time interval-based mesh solar radiation amount and the solar power generation amount being identified for each mesh, and a sum of the non-linear models being created, it is possible to create a model representing the non-linear relation of the solar power generation amount and the solar radiation amount of the area.

Note that, in the power generation amount management system 100, while a power generation conversion model is created, prediction using the created power generation conversion model may also be performed with an external computer system of the power generation amount management system 100. In other words, the power generation amount prediction unit 133 may also be an example of the optional function. Moreover, the "creation" of the power generation conversion model may include either the new creation of a power generation conversion model or the learning of the power generation conversion model. For example, learning of the power generation conversion model may be performed using the training data in the learning phase, and prediction using the power generation conversion model may be performed in the inference phase.

Moreover, as shown in FIG. 1, the non-parametric correction unit 134 may be realized as an example of the optional function.

The non-parametric correction unit 134 learns, as illustrated in FIG. 3, an error model (ERR$_{model}$) based on a non-parametric method. An error model is a model of an error (power generation amount error) between a prediction value of the solar power generation amount calculated with a past time interval (T) as a future time interval, and an actual value of the solar power generation amount of that past time interval. For example, a power generation amount error is influenced by a plurality of types of weather elements (for example, solar radiation amount, wind speed, temperature and the like). Thus, as the error model, adopted is a model having, as its elements, an error $ERR_T$ in the time interval T (error between the prediction value and the actual value of the area solar power generation amount), and a plurality of types of weather elements that influence the power generation amount error. For example, as the error model, $ERR_{model}$=Boosting($ERR_T$, {solar radiation amount, wind speed, temperature, . . . }) may be adopted. In other words, the boosting learning of the power generation amount error may be performed. Note that the learning of the error model does not necessarily have to be performed each time that the calculation of the prediction value of the solar power generation amount is performed. For example, when the error model is learned to a certain level, after a prediction value of the solar power generation amount is calculated, the prediction value may be corrected using the learned error model.

The non-parametric correction unit 134 corrects the prediction value of the solar power generation amount calculated regarding the future time interval of the area 2 using the learned error model. For example, the non-parametric correction unit 134 acquires a prediction value of the power generation amount error by inputting a plurality of types of weather elements regarding the future time interval T into the learned error model, and reflects (for example, adds) the acquired prediction value of the power generation amount error in the calculated prediction value of the solar power generation amount regarding the future time interval T. In this manner, the non-parametric correction unit 134 corrects the output value of the power generation conversion model as a parametric model (prediction value of the area solar power generation amount) based on a non-parametric method. With regard to the parametric power generation conversion model (for example, regression model), while it is difficult to reflect an exception that does not follow the parameters, a more accurate prediction value can be expected by correcting a prediction value in a parametric model based on a non-parametric method.

Figure 9:
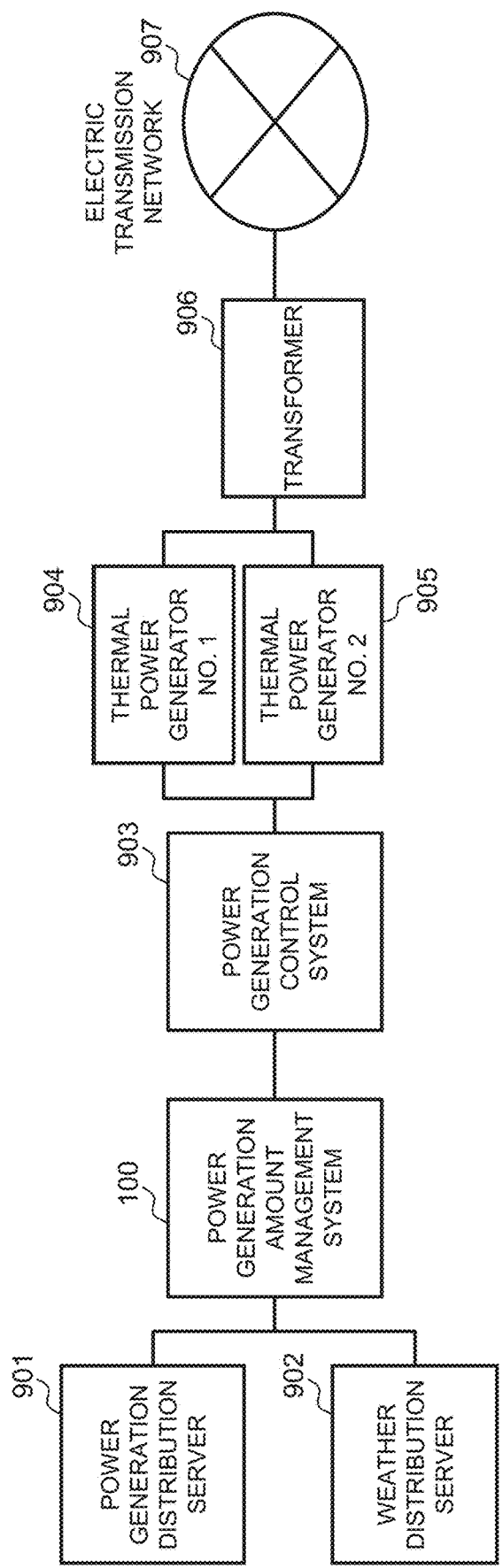
FIG. 9 is a diagram showing a configuration example of the power generation system using the power generation amount management system.
Figure 10:
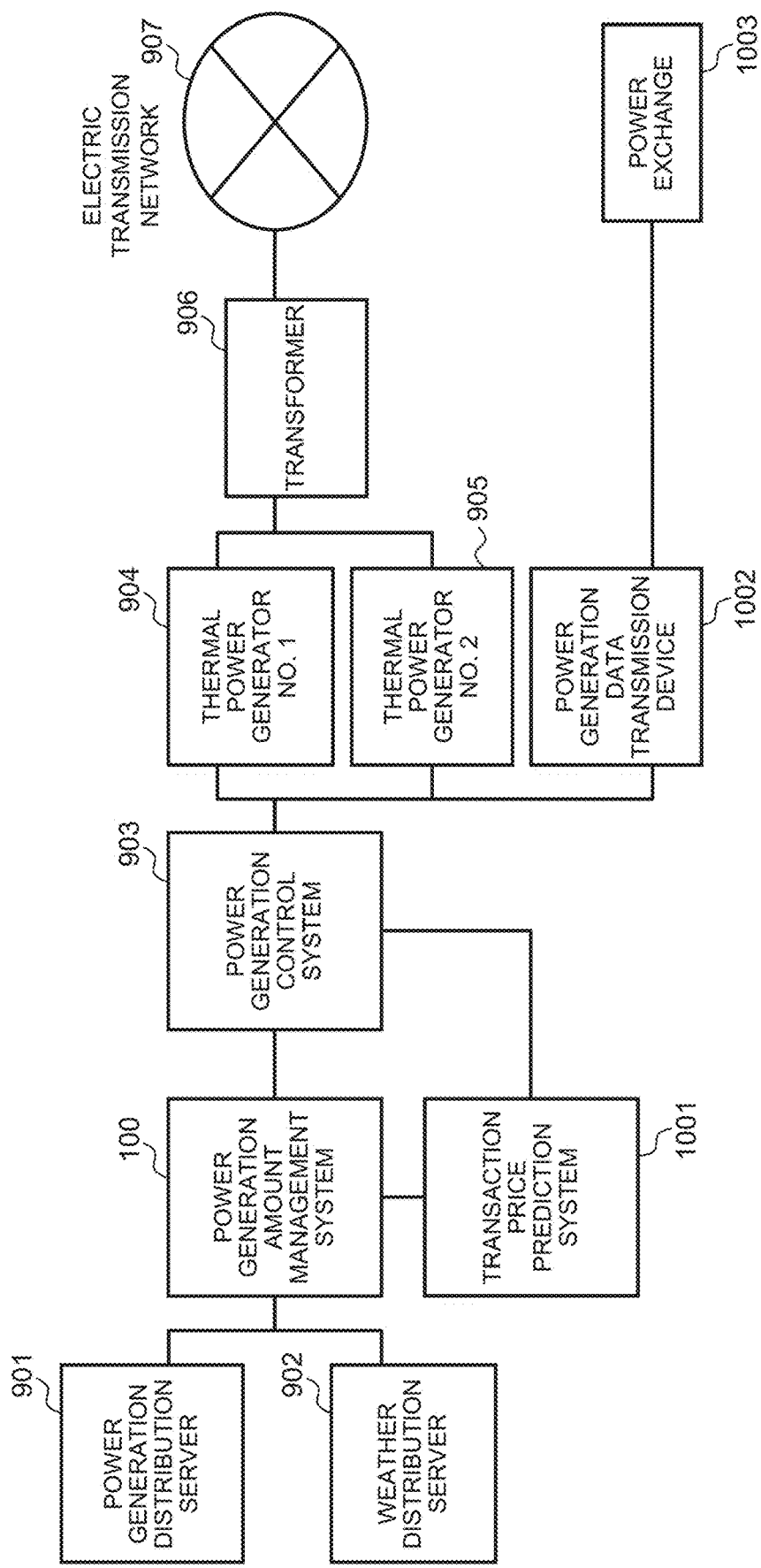
FIG. 10 is a diagram showing a configuration example of the power generation interchanging system using the power generation amount management system.

Meanwhile, as a use case of the power generation amount management system 100, for example, considered may be the use cases illustrated in FIG. 9 and FIG. 10.

FIG. 9 is a diagram showing a configuration example of a power generation system using the power generation amount management system 100.

A power generation system includes a power generation control system 903 linked to the power generation amount management system 100 (for example, connected to the interface apparatus 110 via a communication network). In substitute for the power generation control system 903, the function as the power generation control system 903 may also be realized by the processor 130 of the power generation amount management system 100 executing a program group.

The power generation amount management system 100 stores, in the actual power generation DB 122, actual power generation data received from a power generation distribution server 901 as one type of external server (for example, server of an electricity transmission utility). Moreover, the power generation amount management system 100 stores, in the weather DB 121, numerical weather data received from a weather distribution server 902 as one type of external server (for example, server of a weather agency). The power generation amount management system 100 (for example, power generation amount prediction unit 133) sends, to the power generation control system 903, a prediction value of the area solar power generation amount (for example, power generation prediction data stored in the power generation prediction DB 124) regarding a future time interval (for example, each of a plurality of future time intervals). The power generation control system 903 is a system which controls a thermal power generator 904 that performs power generation based on thermal power (an example of a power generator that performs power generation based on depletable energy).

The power generation control system 903 calculates a prediction value of the required power generation amount based on thermal power (an example of depletable energy) from a prediction value of the electric energy demand of a future time interval based on a prediction value of the area solar power generation amount, and a prediction value of the electric energy demand of a future time interval represented by the given power demand data. The power generation control system 903 decides a power generation plan of a future time interval for controlling the thermal power generator 904 (or the thermal power generator 905 as a spare machine of the thermal power generator 904) based on the calculated prediction value of the power generation amount.

Specifically, for example, the power generation control system 903 identifies the electric energy demand of the overall area 2 from the estimated demand data which has been applied for in advance with the transmission department of a power company (an example of the given power demand data which is data representing the electric energy demand for each time interval). The power generation control system 903 calculates, as the power generation to be shared by the thermal power generator 904 (or 905), the amount obtained by subtracting the prediction value of the solar power generation amount from the electric energy demand of the overall area 2 as the shared demand for which the thermal power generator 904 (or 905) is to perform power generation. For example, the power generation control system 903 calculates the shared electric energy demand for the next 24 hours in 30-minute intervals, and creates a power generation plan for performing power generation in the amount of the shared electric energy demand. The power generation control system 903 sends, to the thermal power generator 904 (and 905), a command signal of power generation according to the created power generation plan. The power generated by the generator 904 is boosted with a transformer 906, and distributed to an electric transmission network 907.

Accordingly, prediction of the solar power generation amount performed by the power generation amount management system 100 contributes to the creation of a power generation plan that is appropriate as a power generation plan of power generation based on depletable energy such as thermal power.

FIG. 10 is a diagram showing a configuration example of the power generation interchanging system using the power generation amount management system 100.

The power generation interchanging system includes a power generation system illustrated in FIG. 9, and is a system which performs power interchange through the sale and purchase of surplus electricity to and from a power exchange. For example, the power generation interchanging system includes a transaction price prediction system 1001 linked to the power generation amount management system 100 (for example, connected to the interface apparatus 110 via a communication network) in addition to (or in substitute for) the power generation control system 903 illustrated in FIG. 9. In substitute for the transaction price prediction system 1001, the function as the transaction price prediction system 1001 may also be realized by the processor 130 of the power generation amount management system 100 executing a program group.

The power generation amount management system 100 sends to, a transaction price prediction system 1001, a prediction value of the area solar power generation amount (for example, power generation prediction data stored in the power generation prediction DB 124). The transaction price prediction system 1001 predicts a transaction price of power of a future time interval (price of power decided by a power exchange 1003) based on a non-parametric method using the prediction value of the area solar power generation amount calculated regarding a future time interval by using a parametric power generation conversion model. The transaction price prediction system 1001 sends the predicted transaction price (prediction value of the transaction price of power) to the power generation control system 903. The power generation control system 903 creates a power generation plan regarding the thermal power generators 904 and 905 and the generators of other companies provided by the power exchange 1003 based on a priority method using the predicted transaction price as the index. A power generation command signal according to the created power generation is sent not only to the thermal power generator 904 (and 905), but also to the power exchange 1003 via a power generation data transmission device 1002.

Accordingly, prediction of the solar power generation amount by the power generation amount management system 100 contributes to the prediction of the transaction price of power.

Note that, with regard to the prediction of the transaction price of power, generally speaking, it is technically difficult to define a parametric model, and the transaction price of power is predicted based on a non-parametric method. Thus, in cases where a non-parametric method is adopted also for the prediction (that is, prediction of the area solar power generation amount) that is performed before the prediction of the power transaction price, when a prediction value with a low accuracy is calculated as the prediction value of the area solar power generation amount, there is a possibility that the accuracy of the prediction value of the transaction price may deteriorate considerably. In this embodiment, since a parametric model is adopted as the power generation conversion model, influence caused by the foregoing problem can be reduced.

While an embodiment of the present invention was described above, the foregoing embodiment is illustrated for explaining the present invention, and is not intended to limit the scope of the present invention only to the foregoing embodiment. The present invention can also be worked in various other modes.

Figure 11:
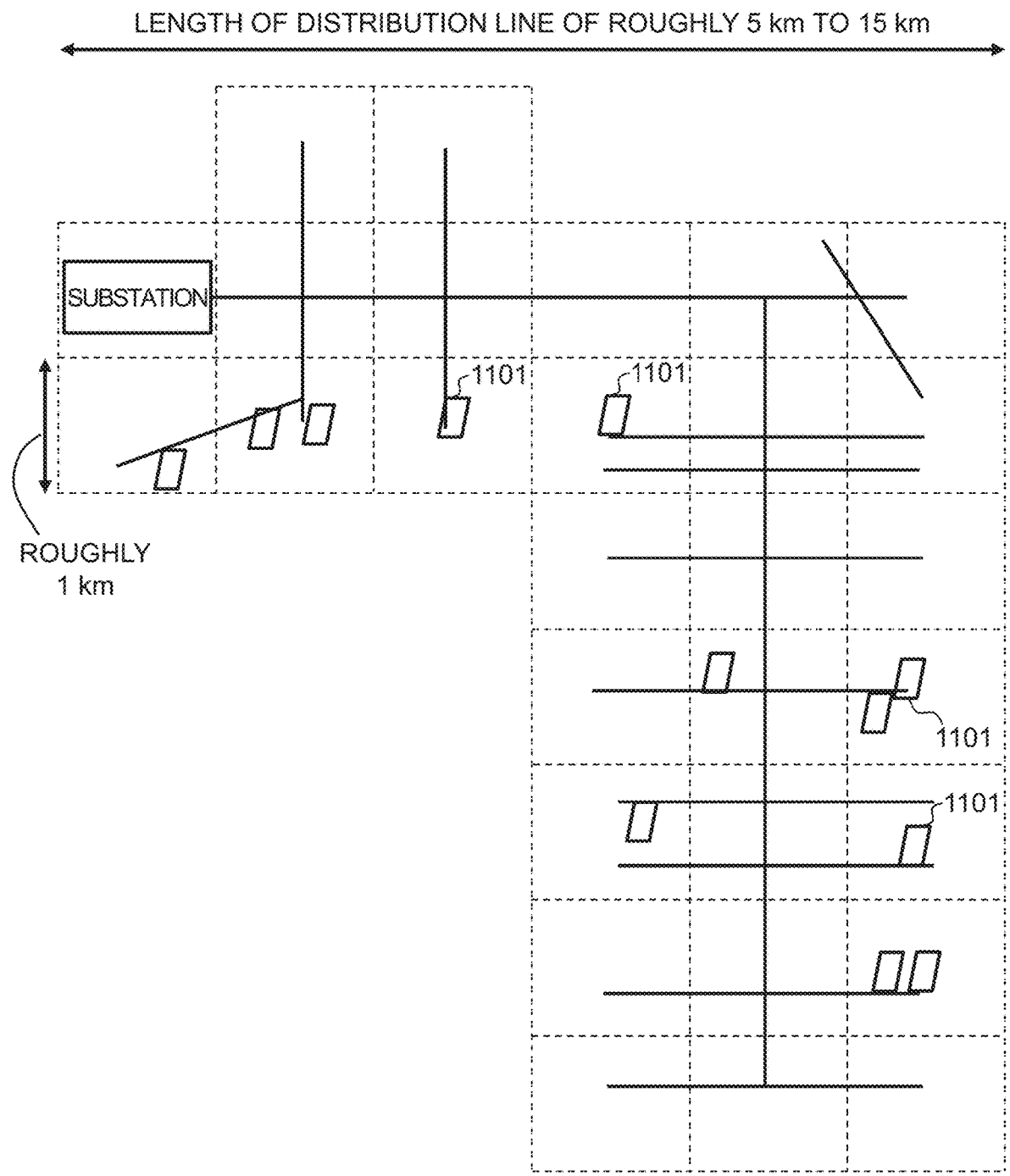
FIG. 11 is a diagram showing an example of the relation of the installation areas and the meshes of power distribution systems.

For example, the area may be an area other than the power supply area, such as the installation area of transmission systems or power distribution systems. FIG. 11 is a diagram showing an example of the relation of the installation areas of the power distribution systems and the meshes. The power distribution system includes power consuming appliances such as household electric appliances, as well as solar power generators 1101 installed by consumers.

Moreover, for example, the present invention can also be applied to the power generation amount prediction of other types of renewable energy without limitation to sunlight. For example, renewable energy may also be wind power, and the weather element that influences the renewable energy power generation amount may also be wind speed. When the renewable energy is wind power, generally speaking, the blades of a wind power power generator will not rotate unless there is a certain level of wind speed, and the rotational speed of the blades becomes constant or the blades will stop rotating when the wind speed becomes a certain value or higher. In other words, when the renewable energy is wind power, the relation of the wind power power generation amount and the wind speed is of a non-linear relation. Accordingly, the present invention can also be applied to wind power.

Moreover, for example, the present invention may also be broadly applied to various types of energy operation systems configured from a plurality of energy operation devices which predict the renewable energy power generation amount in an area from the result of the analytical calculation of the time evolution using the governing equation of the air motion, and operate the energy within the area based on the prediction result.

REFERENCE SIGNS LIST

100 . . . power generation amount management system, 131 . . . mesh solar radiation amount calculation unit, 132 . . . power generation conversion model creation unit, 133 . . . power generation amount prediction unit

The invention claimed is:

1. A power generation amount management system, comprising:
an interface apparatus which accepts inputs of actual power generation data, actual weather data and weather prediction data;
a storage apparatus which stores the actual power generation data, actual weather data and weather prediction data input through the interface apparatus; and
a processor which is coupled to the interface apparatus and the storage apparatus,
wherein the actual power generation data is data made publicly available by a first institution and represents an actual value of a renewable energy power generation amount, which is a power generation amount based on a predetermined type of renewable energy in an area, regarding each of a plurality of past time intervals,
wherein the area is divided into a plurality of sections and each section includes a plurality of segments,
wherein the actual weather data is data made publicly available by a second institution and represents an actual value of a weather element for each segment regarding each of a plurality of past time intervals,
wherein the weather prediction data is data made publicly available by the second institution and which represents a prediction value of a weather element for each segment regarding a future time interval,
wherein a weather element is an element that influences the renewable energy power generation amount,
wherein the processor is programmed to:
refer to the actual weather data, and calculate an actual value of a weather element for each past time interval regarding each of section based on an actual value of a weather element for each past time interval regarding each segment in the corresponding section,
refer to the actual power generation data, and create a power generation conversion model which is a model that uses a value of a weather element for each section as an input and uses a value of the renewable energy power generation amount of the area as an output based on the actual value of the weather element calculated regarding each past time interval for each section, and the actual value of the renewable energy power generation amount of the area regarding each past time interval, and refer to the weather prediction data, and calculate a prediction value of the weather element of a future time interval regarding each of the plurality of sections including the area based on a prediction value of the weather element of a future time interval regarding each segment belonging to the corresponding section, and calculate a prediction value of the renewable energy power generation amount of a future time interval regarding the area by inputting the prediction value of the weather element calculated for each section into the power generation conversion model.

2. The power generation amount management system according to claim 1,
wherein the power generation conversion model is a combination of a parametric non-linear model of a number that is fewer than a number of sections and a linear model having the non-linear model as an element.

3. The power generation amount management system according to claim 1,
wherein the power generation conversion model is a parametric model, and
wherein the processor learns, based on a non-parametric method, an error model which is a model of an error between a prediction value of the renewable energy power generation amount calculated with a past time interval as a future time interval, and an actual value of the renewable energy power generation amount of the corresponding past time interval.

4. The power generation amount management system according to claim 3,
wherein the power generation conversion model is a parametric model, and
wherein the processor corrects a prediction value of the renewable energy power generation amount calculated regarding a future time interval of the area by using the learned error model.

5. The power generation amount management system according to claim 1,
wherein the processor, or a power generation control system which controls a power generator for performing power generation based on depletable energy and is connected to the interface apparatus is programmed to:
calculate a prediction value of a required power generation amount based on depletable energy from a prediction value of an electric energy demand of a future time interval based on a prediction value of the renewable energy power generation amount calculated regarding a future time interval and a prediction value of an electric energy demand of a future time interval which represents given power demand data, and
decide a power generation plan of a future time interval for controlling the power generator based on the calculated prediction value of the power generation amount.

6. The power generation amount management system according to claim 1,
wherein the processor, or a transaction price prediction system connected to the interface apparatus, is programmed to predict a transaction price of power of a future time interval based on a non-parametric method by using a prediction value of the renewable energy power generation amount calculated regarding a future time interval based on a parametric power generation conversion model, and
wherein the power generation conversion model is a parametric model.

7. The power generation amount management system according to claim 1,
wherein the predetermined type of renewable energy is sunlight, and
wherein the weather element is a solar radiation amount.

8. The power generation amount management system according to claim 1,
wherein the predetermined type of renewable energy is wind power, and
wherein the weather element is wind speed.

9. A power generation amount management method,
wherein a computer accepts inputs of actual power generation data, actual weather data and weather prediction data,
wherein the actual power generation data is data made publicly available by a first institution and which represents an actual value of a renewable energy power generation amount, which is a power generation amount based on a predetermined type of renewable energy in an area, regarding each of a plurality of past time intervals,
wherein the actual weather data is data made publicly available by a second institution and which represents an actual value of a weather element for each segment regarding each of a plurality of past time intervals,
wherein the weather prediction data is data made publicly available by the second institution and which represents a prediction value of a weather element for each segment regarding a future time interval,
wherein a weather element is an element that influences the renewable energy power generation amount,
wherein the method comprises:
referring, by a computer, to the actual weather data, and calculating an actual value of a weather element for each past time interval regarding each of a plurality of sections including the area based on an actual value of a weather element for each past time interval regarding each of one or more segments in the corresponding section;
referring, by the computer, to the actual power generation data, and creating a power generation conversion model which is a model that uses a value of a weather element for each section as an input and uses a value of the renewable energy power generation amount of the area as an output based on the actual value of the weather element calculated regarding each past time interval for each section, and the actual value of the renewable energy power generation amount of the area regarding each past time interval; and
referring, by the computer, to the weather prediction data, and calculating a prediction value of the weather element of a future time interval regarding each of the plurality of sections including the area based on a prediction value of the weather element of a future time interval regarding each of one or more segments belonging to the corresponding section; and
calculating, by the computer, a prediction value of the renewable energy power generation amount of a future time interval regarding the area by inputting the prediction value of the weather element calculated for each section into the power generation conversion model.

10. The power generation amount management system according to claim 4,
wherein the correcting using the learned error model is to acquire a power generation amount error by inputting a plurality of types of weather elements regarding the future time interval into the learned error model, and to reflect the acquired prediction value of the power generation amount error in the calculated prediction value of the renewable energy power generation amount.

* * * * *